Feb. 19, 1957 C. H. HERR, JR., ET AL 2,781,860
HYDRAULIC STEERING MECHANISM FOR JOINTED VEHICLES
Filed March 24, 1955 2 Sheets-Sheet 1

Inventors
Charles H. Herr Jr.
George O. Christensen
by Charles L. Schwab
Attorney Feb. 19, 1957  C. H. HERR, JR., ET AL  2,781,860
HYDRAULIC STEERING MECHANISM FOR JOINTED VEHICLES
Filed March 24, 1955  2 Sheets-Sheet 2

Inventors
Charles H. Herr Jr.
George O. Christensen
by Charles L. Schwab
Attorney United States Patent Office 2,781,860
Patented Feb. 19, 1957

2,781,860

HYDRAULIC STEERING MECHANISM FOR JOINTED VEHICLES

Charles H. Herr, Jr., and George O. Christensen, Springfield, Ill., assignors to Allis-Chalmers Manufacturing Company, Milwaukee, Wis.

Application March 24, 1955, Serial No. 496,390

11 Claims. (Cl. 180—79.2)

This invention relates to motor vehicles, and it is concerned more particularly with a steering mechanism for articulated vehicles, that is, for vehicles of the type in which a wheel supported front unit and a wheel supported rear unit are pivotally connected with each other for relative horizontal angling about a common axis.

In larger vehicles of the mentioned character, particularly heavy off the road type vehicles, it is customary to provide a power operated mechanism under the control of the vehicle operator which will keep the front and rear units aligned for straight course driving and which will angle these units for steering to the right or left as desired. The forward unit may be supported by a single wheel as in the case of certain road roller constructions, or it may be supported by a pair of propelling wheels disposed on opposite sides of the vehicle. An example of the latter type of vehicle is the well known earth mover or scraper construction wherein a two wheel tractor unit is pivotally connected at its rear end with a trail type implement unit such as a wagon or scraper.

It is desirable that steering mechanisms for vehicles of the hereinbefore outlined character be capable of delivering a substantial amount of steering torque because considerable steering resistance may be encountered under extreme operating conditions such as when the vehicle is moving slowly in rough terrain. A further requirement, particularly for earth movers and scrapers, is that the steering mechanism be capable of delivering the steering torque through a total steering arc of 180 degrees so that the front and rear units of the vehicle may be angled from an aligned condition to either side through an arc of 90 degrees. It is also customary to operate the steering mechanism hydraulically and in that connection it is further desirable to provide simple hydraulic equipment such as the ordinary linear piston cylinder without cumbersome motion transmitting apparatus such as chains and sprockets, cables, and the like.

Generally, it is an object of this invention to provide an improved power operated steering mechanism for vehicles which will take care of the hereinbefore outlined requirements in a practical and fully satisfactory manner.

More specifically, it is an object of this invention to provide an improved steering mechanism for vehicles wherein a power operated extensible mechanism is mounted on a vehicle so as to furnish an adequate amount of steering torque throughout the operating range of the steering mechanism.

A further object of this invention is to provide an improved steering mechanism for vehicles in which a pivoted power operated extensible mechanism is operable to swing a forward propelling unit of the vehicle with respect to a trailing unit through a total angle of 180 degrees.

Another object of this invention is to provide an improved steering mechanism of the hereinbefore outlined character having a linear hydraulic piston cylinder and associated power transmitting linkage of utmost simplicity.

The foregoing and other objects and advantages are attained by the present invention, various novel features of which will become apparent as the following specification is read in conjunction with the accompanying drawings wherein:

Fig. 4 is a detail view showing parts of the tractor and trailer connection and of the steering mechanism in elevation.

Figure 1:
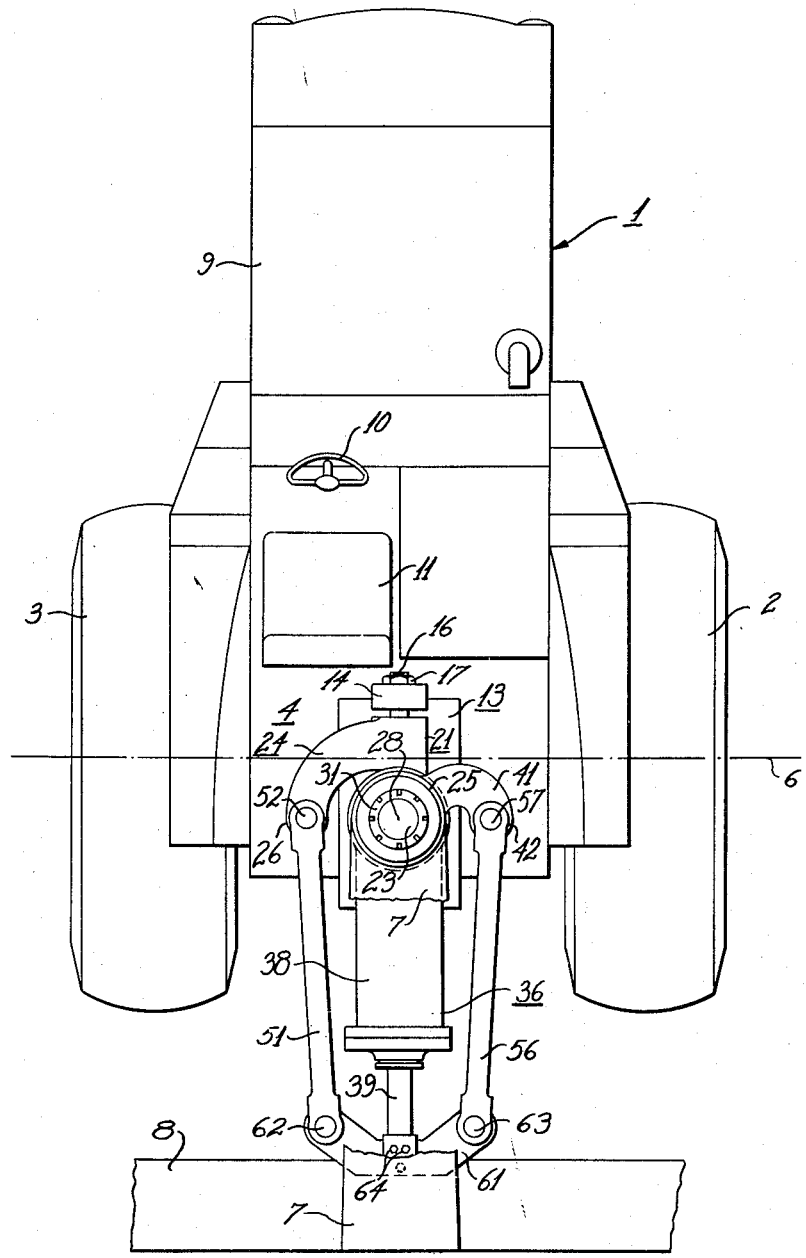
Fig. 1 is a top view of the rear part of a two wheel tractor and associated steering mechanism and trailer connection, the view of Fig. 1 illustrating the steering mechanism in a condition for straight course driving.
Figure 2:
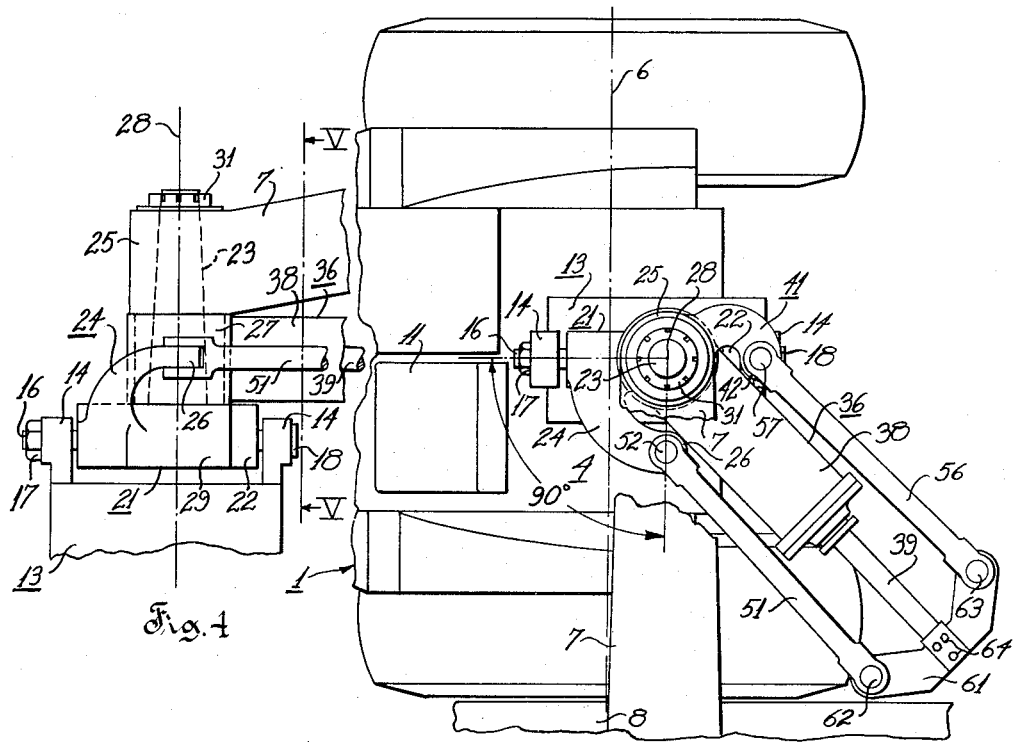
Fig. 2 is another top view of the tractor rear part, steering mechanism and trailer connection shown in Fig. 1, the view of Fig. 2 illustrating a steering condition in which the tractor is turned 90 degrees to the left from the straight course driving position in which it is shown in Fig. 1.
Figure 3:
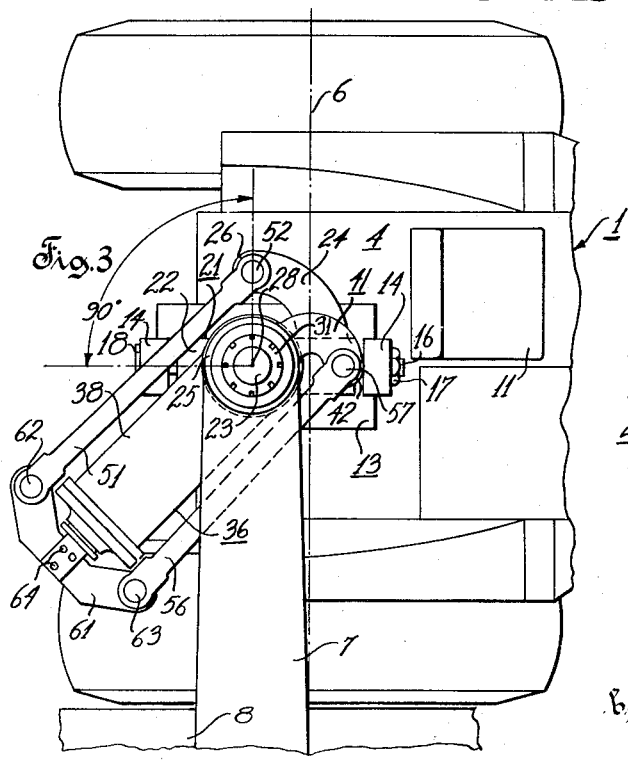
Fig. 3 is a view similar to Fig. 2, but illustrating a steering condition in which the tractor is turned 90 degrees to the right from the straight course driving position in which it is shown in Fig. 1.

Referring to Fig. 1, a two wheel tractor unit 1 of generally conventional construction has a pair of oppositely disposed traction wheels 2 and 3 which are mounted on a rigid frame structure 4 for rotation about a common transverse axis indicated by the line 6. The tractor unit 1 is connected by means of a pivot assembly, shown in Figs. 4 and 5, with a trailer unit of which only part of a gooseneck or yoke 7 and of a transverse frame bar 8 are shown. The gooseneck or yoke 7 and the frame bar 8 are rigidly connected together and are part of a conventional trailer unit having a pair of rear support wheels, not shown, which are mounted for rotation about an axis parallel to frame bar 8 so that the tractor-trailer combination will be traveling straight ahead when the frame bar 8 is parallel to the traction wheel axis 6, as shown in Fig. 1. Yoke 7 and trailer frame bar 8 are suitably arranged so that either of the tractor wheels 2 and 3 may swing fully beneath yoke 7 when the vehicle is executing a 90 degree left or right hand turn as shown in Figs. 2 and 3.

The tractor unit 1 includes an engine, not shown, located forwardly in the vehicle under a hood 9. The engine supplies power by means of conventional power transmitting mechanism, not shown, to the traction wheels 2 and 3 and, in addition, drives a fluid pump, not shown, which supplies pressure fluid for actuating the steering mechanism. A steering wheel 10 in front of an operator's seat 11 and an associated hydraulic valve mechanism of conventional construction, not shown, are provided to control operation of a steering mechanism which is operatively interposed between the tractor and trailer units and which will be more fully described hereinbelow.

Figure 5:
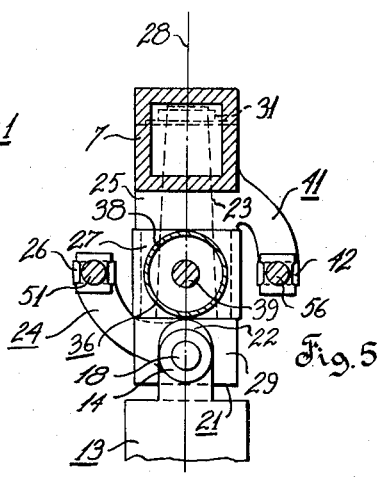
Fig. 5 is a sectional view along line V—V of Fig. 4.

Referring to Figs. 4 and 5, fixed to a central portion of the main tractor frame structure 4 and projecting upwardly therefrom is a bracket 13, and a horizontal pivot pin 16 is mounted in upstanding arms 14 of the bracket 13 so as to extend in a vertical plane at right angles to the traction wheel axis 6. Nut 17 and flange 18 hold pin 16 against longitudinal displacement within bracket 13.

Rotatably supported about pin 16 for lateral tilting relative to the tractor frame 4 is a joint head 21 which includes a sleeve 22 encompassing pin 16, and an upstanding pivot pin or spindle 23 which is integrally formed with and extends radially from sleeve 22 intermediate the ends of the latter. In addition to the sleeve 22 and spindle 23, the joint head 21 includes a first arcuate torque arm 24 which is rigidly connected with a forward portion of the sleeve 22 and has a free end portion 26 which is offset laterally from spindle portion 23 toward the left side of the vehicle. The end portion 26 is also offset upwardly relative to the horizontal pivot pin 16 for clearance purposes.

Figs. 1, 4 and 5 illustrate the position which the joint head 21 occupies when the tractor unit 1 and the trailer unit are placed on level ground, that is, when the traction wheel axis 6 and the axis, not shown, of the trailer support wheels extend parallel to a horizontal plane. In this condition, spindle 23 projects vertically upward from pivot pin 16. On uneven ground the tractor and trailer units may tilt transversely one relative to the other due to the pivotal mounting of the joint head 21 on the horizontal pivot pin 16, and the units are held in vertically rigid relation to one another through the joint head 21 being pivotally secured to tractor unit 1 on an axis in longitudinal relation to the tractor unit 1.

Referring again to Fig. 4, integrally formed with the forward portion of trailer yoke 7 is a vertical sleeve member 25 having a reduced journal portion 27. Sleeve member 25 of the trailer yoke is journaled on spindle 23 of the joint head 21, and the axis 28 of the spindle 23 therefore represents a common axis on which the tractor and trailer units may be angled horizontally relative to each other into and out of a straight course driving position, as will be more fully explained hereinbelow.

The lower end of the sleeve member 25 is rotatably supported on an enlarged portion 29 of the joint head 21, and a nut 31 and associated washer at the upper end of spindle 23 secure the sleeve member 25 against axial separation from spindle 23.

Pivotally mounted on reduced journal portion 27 at the lower end of sleeve member 25 for rotation about pivot axis 28 is a power operated extensible hydraulic ram or jack 36. As shown in Fig. 4, hydraulic jack 36 is of the double acting type having relatively contractible and expansible thrust transmitting elements in the form of a piston rod 39 and a cylinder 38 and having a piston, not shown, secured to the inner end of piston rod 39. Cylinder 38 is pivotally mounted at one end on journal portion 27 for horizontal swinging movement relative to the front and rear units about the common axis 28. Suitable pressure fluid connections, not shown, are made between hydraulic ram cylinder 38 and the control valve, not shown, which, as stated, is connected with steering wheel 10 so that the operation of the jack 36 may be controlled by steering wheel 10.

As can best be seen in Figs. 1 and 5, a second arcuate torque arm 41 is secured to an upper portion of trailer yoke sleeve member 25 and extends outwardly and downwardly from said sleeve member so as to present a free end 42 which is offset laterally from spindle portion 23 toward the right side of the vehicle. With the condition of the parts as shown in Fig. 1, that is, with the tractor-trailer vehicle traveling straight ahead, end portion 26 of torque arm 24 and end portion 42 of torque arm 41 lie on opposite sides, respectively, of pivot axis 28.

A rigid bar or first link 51 is pivotally mounted by pin 52 at one of its ends on end portion 26 of torque arm 24. Similarly, another rigid bar or second link 56 is pivotally mounted by pin 57 at one of its ends on end portion 42 of torque arm 41. Pins 52 and 57 afford pivot centers at predetermined radial distances from pivot axis 28. Links 51 and 56 extend rearwardly from pivot pins 52 and 57 and are joined together at their rearward relatively adjacent ends for pivotal movement with respect to each other by means of a yoke 61 and pivot pins 62 and 63. The outer end of piston rod 39 is fastened as by bolts 64 to an intermediate portion of piston rod yoke 61. It should be noted that the radial distances of the pivot centers 52, 57 from the common axis 28 and the effective lengths of the links 51 and 56 are proportioned so as to position the pivot centers 52 and 57 at opposite sides of and in coplanar relation with the common axis 28 when the front and rear units are in the straight course driving position shown in Fig. 1.

Steering of the vehicle is accomplished by adjusting the relative angular positions of the tractor and trailer units about this common pivot axis 28. This angular adjustment about pivot axis 28 is brought about by swinging torque arm 24, which is secured to joint head 21 and supported by the tractor unit of the vehicle, with respect to torque arm 41 which is secured to sleeve section 25 and supported by the trailer unit of the vehicle. Contraction or expansion of hydraulic ram 36 will produce this relative pivotal movement. For instance, contraction of hydraulic ram 36 from the position shown in Fig. 1 moves the piston rod yoke 61 toward the common pivot axis 28. This produces a thrust on links 51 and 56 which will swing the free end 26 of torque arm 24 in front of pivot axis 28 so that pivot axis 28 will be interposed between end portions 26 and 42 of arms 24 and 41 and yoke 61, as shown in Fig. 3. In Fig. 3, the front portion of the vehicle has been swung 90 degrees to the right from the straight ahead position shown in Fig. 1 so that the vehicle is executing a full 90 degree turn to the right. Extension of hydraulic ram 36 from the position shown in Fig. 1 moves the piston rod yoke 61 away from the common pivot axis 28. This produces a pull on bars 51 and 56 which will swing the free end 26 of torque arm 24 to the rear of pivot axis 28 so that the end portions 26 and 42 of torque arms 24 and 41 will be interposed between the pivot axis 28 and piston rod yoke 61 as shown in Fig. 2. In Fig. 2 the front supported portion of the vehicle has been swung 90 degrees to the left from the straight ahead position shown in Fig. 1 so that the vehicle is executing a full 90 degree turn to the left.

By mounting the hydraulic ram 36 for pivotal movement about the common pivot axis 28, the herein disclosed steering mechanism can deliver a substantially uniform amount of steering torque throughout its steering range. Referring to Figs. 2 and 3, it will be noted that when the front unit, which includes the joint head 21 and torque arm 24, is pivoted 90 degrees about the common pivot axis 28 with respect to the rear unit which includes sleeve member 25 and torque arm 41, the hydraulic ram 36 pivots 45 degrees with respect to the front unit and 45 degrees with respect to the rear unit. In other words, the hydraulic ram undergoes a pivotal movement equal to one-half the total pivotal displacement of the front and rear units relative to each other. Thus, for a 90 degree turn from a straight ahead position, end portions 26 and 42 of the arms 24 and 41 move only 45 degrees away from a plane which extends normal to the axis of the hydraulic ram 36 through pivot axis 28. The steering torques applied to the arms 24 and 41 are determined by the radial distances of the pivot pins 52, 57 from the pivot axis 28, and by the tangential components of the forces exerted on end portions 26 and 42 of arms 24 and 41 with respect to pivot axis 28. These tangential force components are greatest when the links 51 and 56 are at right angles to their effective lever arms, which extend from the pivot axis 28 to pivot pins 52 and 57, respectively. It will be seen that the efficiency of the mechanism is enhanced by the ability of the ram 36 to swing about pivot axis 28 while the front and rear units are angularly displaced relative to each other thereby keeping the effective lever arms equal. The herein disclosed mechanism not only permits a substantially uniform amount of steering torque to be delivered throughout the steering range, but it is also particularly well suited for steering applications where 90 degree steering to either side of a straight ahead position is desired. For, as indicated above, even at these extreme steering angles the hydraulic ram is exerting a force on end portions 26 and 42 of arms 24 and 41 at an angle which is only 45 degrees away from a plane normal to the hydraulic ram 36 through axis 28.

By reason of the fact that torque arms 24 and 41 project outwardly and rearwardly so as to present end portions 26 and 42 which lie on transversely opposite sides of pivot axis 28 when the vehicle is in straight ahead position as in Fig. 1, hydraulic ram 36 may be placed, as in Fig. 1, so that it extends longitudinally of the vehicle when the vehicle is in a straight ahead position. Positioning ram 36 in this manner permits the ram to swing freely at the rear of the tractor unit as the tractor unit is turned about pivot axis 28. The arrangement also permits the pivot axis 28 to be located, as in Fig. 1, in close proximity to the tractor seat 11 without interfering with the tractor operator. This is a particularly important feature with large tractor-trailer vehicles since hydraulic rams for these vehicles would, of necessity, be of considerable size. In addition, it reduces to a minimum the height that ram 36 must be placed above the ground in order to clear adjacent portions of the traction wheels 2, 3 when the vehicle is steered to the right or left.

The provision of piston rod yoke 61 intermediate the relatively adjacent ends of links 51 and 56 permits the hydraulic ram to be placed between links 51 and 56 so that links 51 and 56 lie in a horizontal plane with ram 36. With this arrangement, the lineal force generated by ram 36 is delivered directly along this common horizontal plane to the horizontally aligned links 51 and 56.

While we have described only one particular embodiment of our invention, it should be understood that we do not wish to be restricted thereto and that we intend to cover all modifications of the invention which would be apparent to one skilled in the art and that come within the scope of the appended claims.

It is claimed and desired to secure by Letters Patent:

1. A steering mechanism for an articulated vehicle having pivotally interconnected front and rear units adapted for relative horizontal angling about a common axis into and out of a straight course driving position, said mechanism comprising a jack having relatively contractible and expansible thrust transmitting elements, pivot means concentric with said common axis operatively mounting one of said thrust transmitting elements in horizontally swingable relation to both of said units, a pair of links having relatively adjacent ends pivotally connected with the other of said thrust transmitting elements, and a pair of torque transmitting elements operatively connected, respectively, with said front and rear units and pivotally connected with said links on centers at predetermined radial distances from said common axis, said radial distances and the effective lengths of said links being proportioned so as to position said centers at opposite sides of said common axis when said units are in said straight course driving position.

2. A steering mechanism as set forth in claim 1, wherein said centers are at laterally opposite sides of said vehicle when said units are in said straight course driving position.

3. A steering mechanism as set forth in claim 1, wherein said jack is a double acting hydraulic ram having a cylinder and a piston forming said thrust transmitting elements and said ram being disposed so that its line of thrust passes through the pivot connection between said front and rear units.

4. An articulated vehicle comprising in combination, a wheel supported front unit, a wheel supported rear unit, a joint head pivotally mounted on one of said units for swinging movement relative thereto about a horizontal axis extending longitudinally of said one unit, means pivotally connecting the other of said units with said joint head so that said units may be angled horizontally relative to each other about a common axis into and out of a straight course driving position, a jack having relatively contractible and expansible thrust transmitting elements, pivot means concentric with said common axis operatively mounting one of said thrust transmitting elements in horizontally swingable relation to both of said units, a pair of links having relatively adjacent ends pivotally connected with the other of said thrust transmitting elements, and a pair of torque transmitting elements operatively connected, respectively, with said joint head and with said other unit and pivotally connected with said links on centers at predetermined radial distances from said common axis, said radial distances and the effective lengths of said links being proportioned so as to position said centers at substantially diametrically opposite sides of said common axis when said units are in said straight course driving position.

5. An articulated vehicle as set forth in claim 4, wherein said joint head is pivotally mounted on said front unit for lateral tilting movement relative thereto, and wherein said one thrust transmitting element is pivotally mounted on said rear unit for horizontal swinging movement relative thereto and relative to said joint head about said common axis.

6. An articulated vehicle as set forth in claim 5, wherein an arm forming one of said torque transmitting elements is rigidly connected with said joint head and projects therefrom at one of the laterally opposite sides of the latter, and wherein another arm secured to said rear unit and forming the other of said torque transmitting elements is disposed at the other of the laterally opposite sides of said joint head.

7. An articulated vehicle as set forth in claim 6, wherein said links are pivotally connected with the other of said thrust transmitting elements on horizontally spaced centers.

8. A steering mechanism for an articulated vehicle having pivotally interconnected front and rear units adapted for relative horizontal angling about a common axis into and out of a straight course driving position, said mechanism comprising a jack having relatively contractible and expansible thrust transmitting elements, pivot means concentric with said common axis operatively mounting one of said thrust transmitting elements in horizontally swingable relation to both of said units, a pair of links having relatively adjacent ends pivotally connected with a connecting portion of the other of said thrust transmitting elements, and a pair of torque transmitting elements operatively connected, respectively, with said front and rear units and pivotally connected with said links on centers at predetermined radial distances from said common axis, said centers being at diametrically opposite sides of said common axis when said units are in said straight course driving position and said common axis lying on one side of a vertical plane passing through said centers when said units are angled a predetermined extent in one direction from said straight course driving position and lying on the opposite side of said vertical plane when said units are angled a predetermined extent in the opposite direction from said straight course driving position.

9. A steering mechanism for an articulated vehicle having front and rear units pivotally interconnected on a common axis for horizontal angling of said units into and out of a straight course driving position, said mechanism comprising: a horizontally disposed hydraulic ram having one of its relatively extensible and contractible thrust transmitting elements pivotally connected to said vehicle concentric with said common axis for horizontal swinging movement independently of said units; a pair of links disposed at opposite sides of said ram and lying in a plane passing through said ram; first pivot means connecting adjacent ends of said links to the other of said thrust transmitting elements; a pair of torque transmitting arms secured, respectively, to said front and rear units; and second pivot means pivotally connecting the ends of said arms with said links, respectively, on centers disposed at substantially diametrically opposite sides of said common axis when said units are in said straight course driving position, said ram having a line of thrust disposed longitudinally of said vehicle when said units are in said straight course driving position.

10. A steering mechanism as set forth in claim 9, wherein said common axis lies on one side of a vertical plane passing through said centers when said units are angled a predetermined extent in one direction from said straight course driving position and lies on the opposite side of said vertical plane when said units are angled a predetermined extent in the other direction from said straight course driving position.

11. A steering mechanism as set forth in claim 9, wherein said ram, links, first pivot means, arms and second pivot means are constructed, mounted and arranged so as to selectively effect relative angling of said units through a 180 degree range.

References Cited in the file of this patent

UNITED STATES PATENTS

| | | |
|---|---|---|
| 2,193,367 | Harrison et al. | Mar. 12, 1940 |
| 2,557,066 | Armington | June 19, 1951 |
| 2,594,695 | Storey | Apr. 29, 1952 |
| 2,614,644 | Gustafson | Oct. 21, 1952 |
| 2,638,998 | Rockwell | May 19, 1953 |